(12) United States Patent
Jabs

(10) Patent No.: US 8,381,440 B1
(45) Date of Patent: Feb. 26, 2013

(54) POT COVER AND METHOD OF USE

(76) Inventor: Michael William Jabs, Discovery Bay, CA (US)

(*) Notice: Subject to any disclaimer, the term of this patent is extended or adjusted under 35 U.S.C. 154(b) by 289 days.

(21) Appl. No.: 12/552,731

(22) Filed: Sep. 2, 2009

(51) Int. Cl.
*A01G 13/02* (2006.01)

(52) U.S. Cl. ............ 47/66.7; 47/29.5; 47/31.1; 47/32.3; 47/66.6

(58) Field of Classification Search .......... 47/20.1, 47/29.5, 31.1, 32, 58.1 R, 66.6, 66.7, 79
See application file for complete search history.

(56) References Cited

U.S. PATENT DOCUMENTS

| | | | |
|---|---|---|---|
| 2,785,508 A | 3/1957 | Coleman, Jr. | |
| 2,790,269 A | 4/1957 | Coleman, Jr. | |
| 3,857,195 A * | 12/1974 | Johnson | 47/32 |
| 3,940,884 A * | 3/1976 | Mason, Jr. | 47/32 |
| 3,990,179 A | 11/1976 | Johnson et al. | |
| 4,395,845 A | 8/1983 | Markowitz | |
| 4,403,443 A | 9/1983 | Valente | |
| 4,648,203 A * | 3/1987 | Worzek | 47/32 |
| 4,712,329 A | 12/1987 | Anderson et al. | |
| 4,986,025 A | 1/1991 | Imperial | |
| 5,085,001 A * | 2/1992 | Crawley | 47/9 |
| 5,184,421 A * | 2/1993 | Meharg | 47/65.5 |
| 5,323,557 A * | 6/1994 | Sonntag | 47/32 |
| 5,355,623 A * | 10/1994 | Brown | 47/84 |
| 5,522,176 A * | 6/1996 | Suttle | 47/32 |
| 5,711,106 A * | 1/1998 | Ellis | 47/32 |
| 5,918,411 A * | 7/1999 | Hadrava | 47/21.1 |
| 2007/0130825 A1* | 6/2007 | Stearns et al. | 47/31.1 |

* cited by examiner

*Primary Examiner* — David Parsley
(74) *Attorney, Agent, or Firm* — Eric Karich

(57) ABSTRACT

A pot cover has a pair of cover elements that are interlockable to together form a pot cover body. The pot cover body is formed by a plurality of annular cover elements that are concentrically arranged on a horizontal plane to together provide a top surface, an opposed bottom surface, an inner perimeter edge, and an outer perimeter edge. A plurality of concentric spaces are formed between each of the plurality of annular cover elements, and a plurality of radially extending connector strips interconnect the plurality of annular cover elements to hold the annular cover elements in the horizontal plane. The connector strips may be cut between two of the annular cover elements to remove at least one of the annular cover elements.

1 Claim, 5 Drawing Sheets

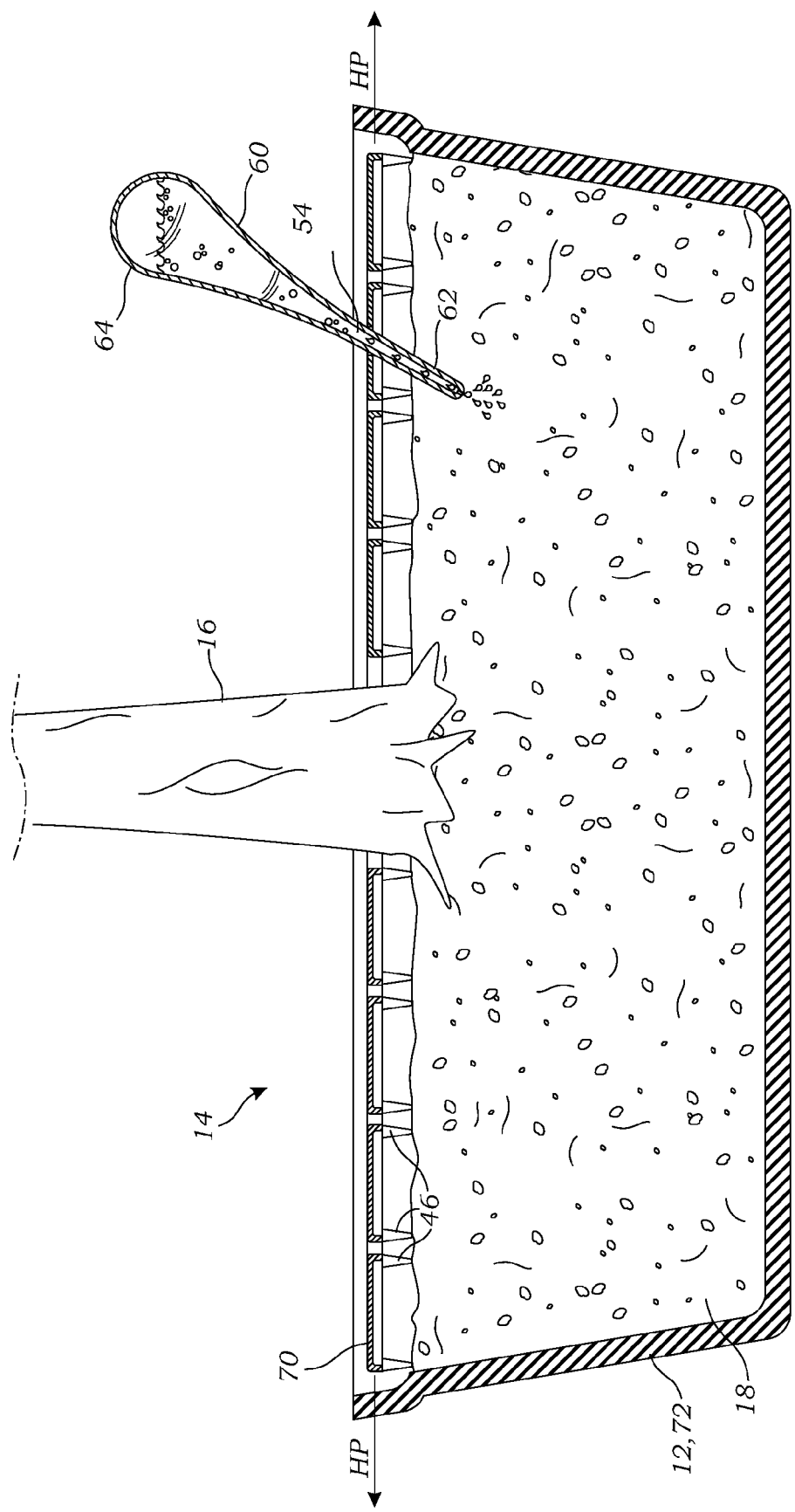

POT COVER AND METHOD OF USE

BACKGROUND OF THE INVENTION

1. Field of the Invention

This invention relates generally to pot covers, and more particularly to a pot cover that is made of annular cover elements some of which may be removed to adjust the dimensions of the pot cover to fit different flower pots and accommodate plants of different sizes.

2. Description of Related Art

Plants are often planted in flower pots (i.e., any pots adapted for holding plants). These potted plants are sometimes placed indoors, although they may remain outdoors too. Plants that are planted in flower pots, especially those placed indoors, often present special difficulties to the owner. A first common problem for potted plants is that the soil may be removed from the flower pot, and potentially scattered about within the house, by pets, children, or simply spilled by accident. Second, fruit from the plant (e.g., strawberries) may rot due to sitting in the wet soil. Third, cleanup of fallen leaves may be difficult if the dead leaves are sitting in the soil. Fourth, it may be difficult to keep the soil properly hydrated, and adding water may also cause soil to be splashed from the flower pot and into the house.

To overcome these problems, it is beneficial to have a pot cover that rests on or over the soil of the flower pot to protect the soil, exclude fallen leaves from the soil, and to maintain the plant (and any fruit) separate from the soil. Various pot covers are taught in the prior art:

Markowitz, U.S. Pat. No. 4,395,845, teaches a plant protector in the form of a disk-like cover is adapted to be friction fitted within a flower pot. The cover is provided with an interior hole to allow a plant to pass through it. At least one cut is provided in the cover from the hole to the outer edge so that it may be placed about a plant growing in the pot.

Anderson et al., U.S. Pat. No. 4,712,329, teaches a lidded container for growing, transporting and storing nursery plants. The container assembly includes in combination an open-topped container dimensioned to receive the root structure of a plant, and a lid which fits within the open top of the container. The lid has a central opening dimensioned to receive the stem or trunk of a plant and a radial slot of predetermined width communicating the opening with the exterior. A slide block or other closure is mountable in the slot. It slidably engages the slot margins when the lid is in its operative position, closing the open top of the container.

Imperial, U.S. Pat. No. 4,986,025, teaches a landscape apparatus that includes a surrounding shield formed with a central aperture positionable about a central stalk or trunk portion of a shrub or tree. The apparatus includes four pie-shaped segments that are interlocked relative to one another utilizing lug members receivable within key-shaped openings of adjacent walls of the pie-shaped segments. The segments include a floor formed with a matrix of apertures.

Other patents teach similar covers, including: Valente, U.S. Pat. No. 4,403,443 (device to prevent soil spillage from a flower pot that is knocked over), Johnson et al., U.S. Pat. No. 3,990,179 (pot for hanging plants), and Coleman, Jr., U.S. Pat. Nos. 2,785,508, and 2,790,269. The above-described references are hereby incorporated by reference in full.

The prior art teaches pot covers. However, the prior art does not teach a pot cover that is made of annular cover elements that may removed to adjust the dimensions of the pot cover to fit different flower pots and accommodate plants of different sizes. The prior art also fails to teach many other structural features of the present invention, and the method steps provided herein. The present invention fulfills these needs and provides further related advantages as described in the following summary.

SUMMARY OF THE INVENTION

The present invention teaches certain benefits in construction and use which give rise to the objectives described below.

The present invention provides a pot cover and method for covering an opening of a flower pot around a plant planted in soil in the flower pot. The pot cover is formed by a pair of cover elements that are interlockable to together to form a pot cover body. The pot cover body is formed by a plurality of annular cover elements that are concentrically arranged on a horizontal plane to together provide a top surface, an opposed bottom surface, an inner perimeter edge, and an outer perimeter edge, with the inner perimeter edge having an inner diameter and the outer perimeter edge having an outer diameter. A plurality of concentric spaces are formed between each of the plurality of annular cover elements. A plurality of radially extending connector strips interconnect the plurality of annular cover elements to hold the annular cover elements in the horizontal plane, wherein the radially extending connector strips may be cut between two of the annular cover elements to remove at least one of the annular cover elements for the purposes of selectively increasing the inner diameter to accommodate larger plants, and/or reducing the outer diameter of the pot cover body to accommodate smaller flower pots.

A primary objective of the present invention is to provide a pot cover and method having advantages not taught by the prior art.

Another objective is to provide a pot cover that is made of annular cover elements that may removed to adjust the dimensions of the pot cover to fit different flower pots and accommodate plants of different sizes.

A further objective is to provide a pot cover that includes novel tabs and slots to enable the quick assembly of two cover elements to form the pot cover.

A further objective is to teach a pot cover and method that includes additional features and method steps described in greater detail below.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 5 is a sectional view thereof taken along line 5-5 in FIG. 4.

DETAILED DESCRIPTION OF THE INVENTION

The above-described drawing figures illustrate the invention, a pot cover 10 for covering an opening 14 of a flower pot 12 around a plant 16 planted in soil in the flower pot 12.

Figure 1:
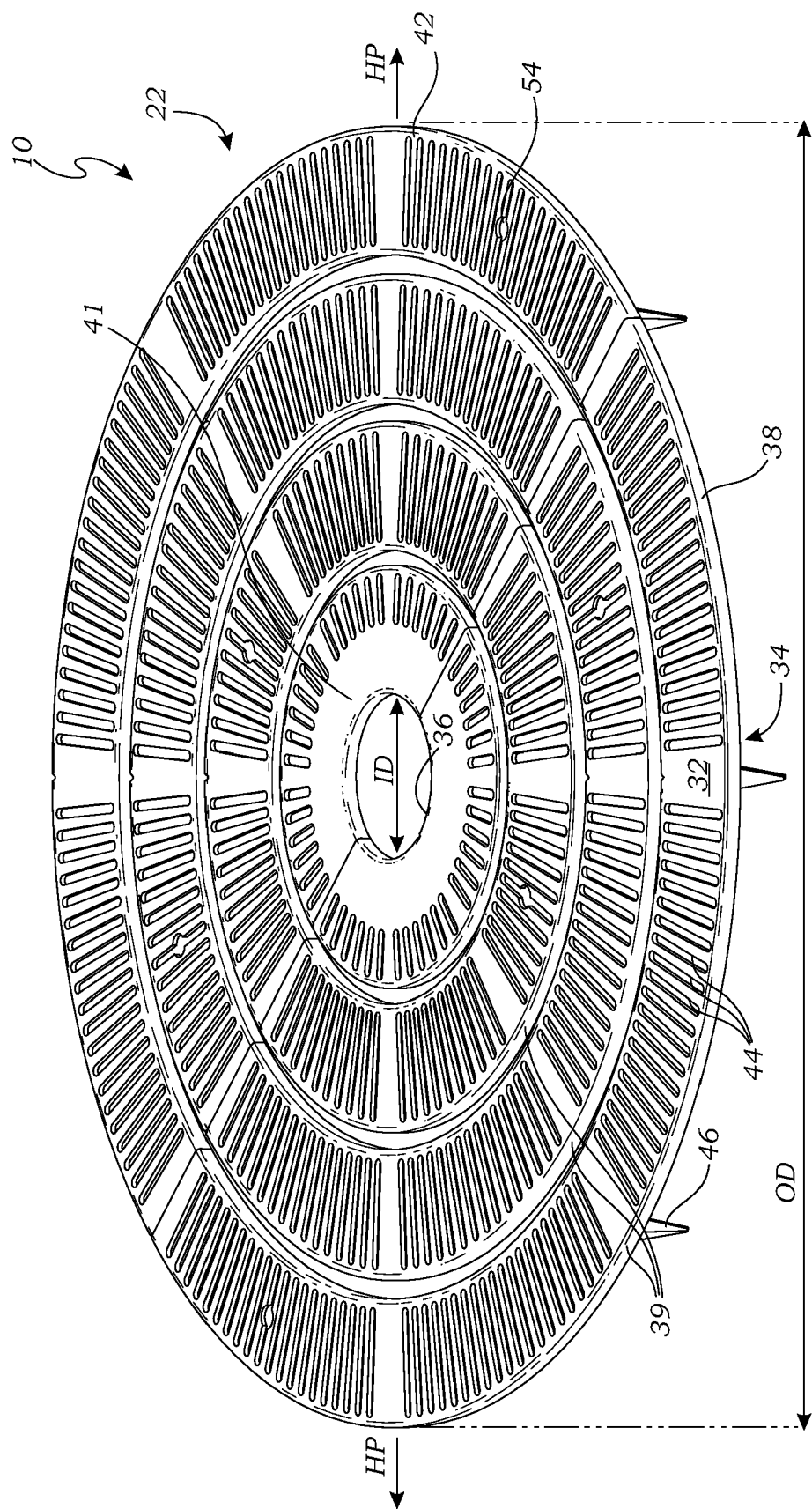
FIG. 1 is a perspective view of a pot cover according to one embodiment of the present invention.
Figure 2:
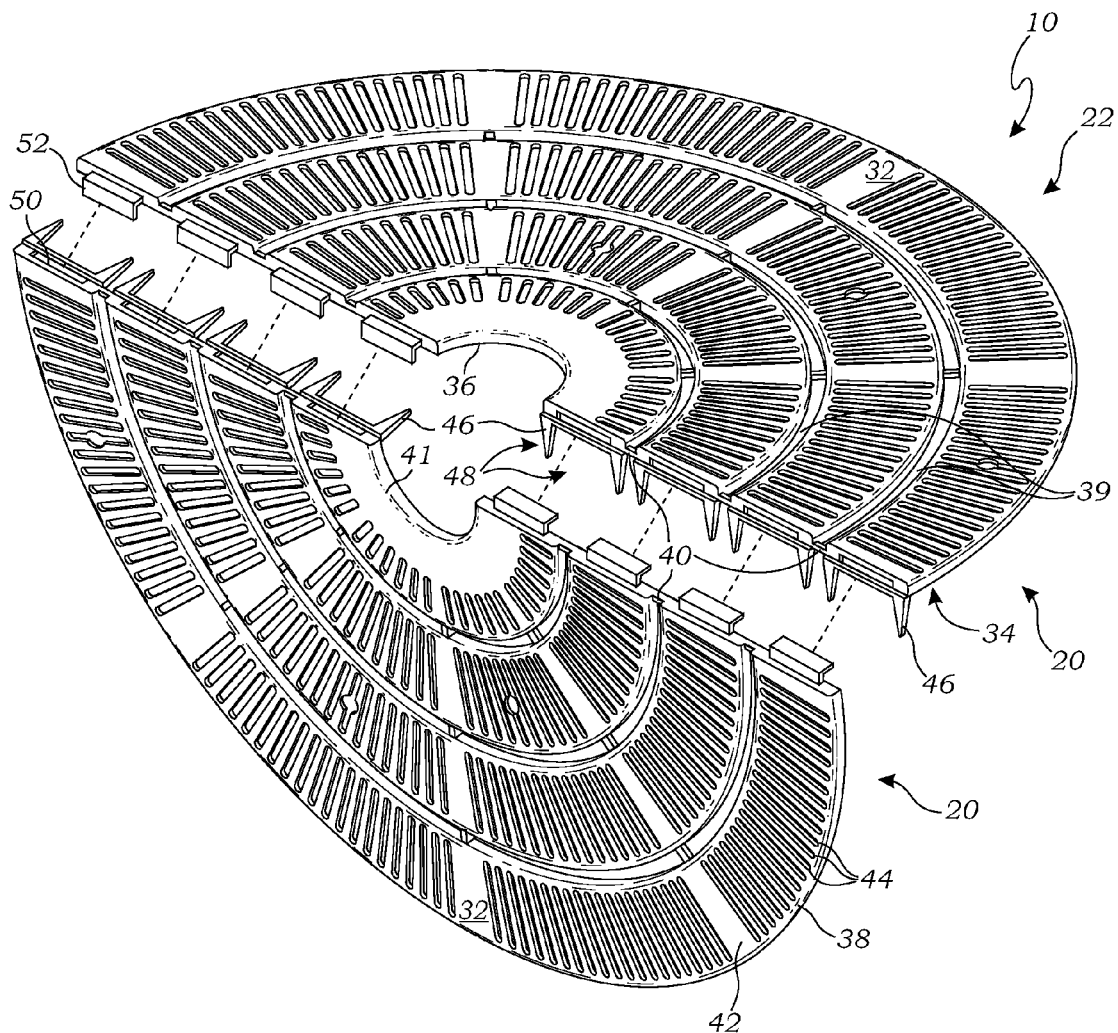
FIG. 2 is a perspective view of the pot cover, illustrating a pair of cover elements being interconnected to form the pot cover of FIG. 1.
Figure 3:
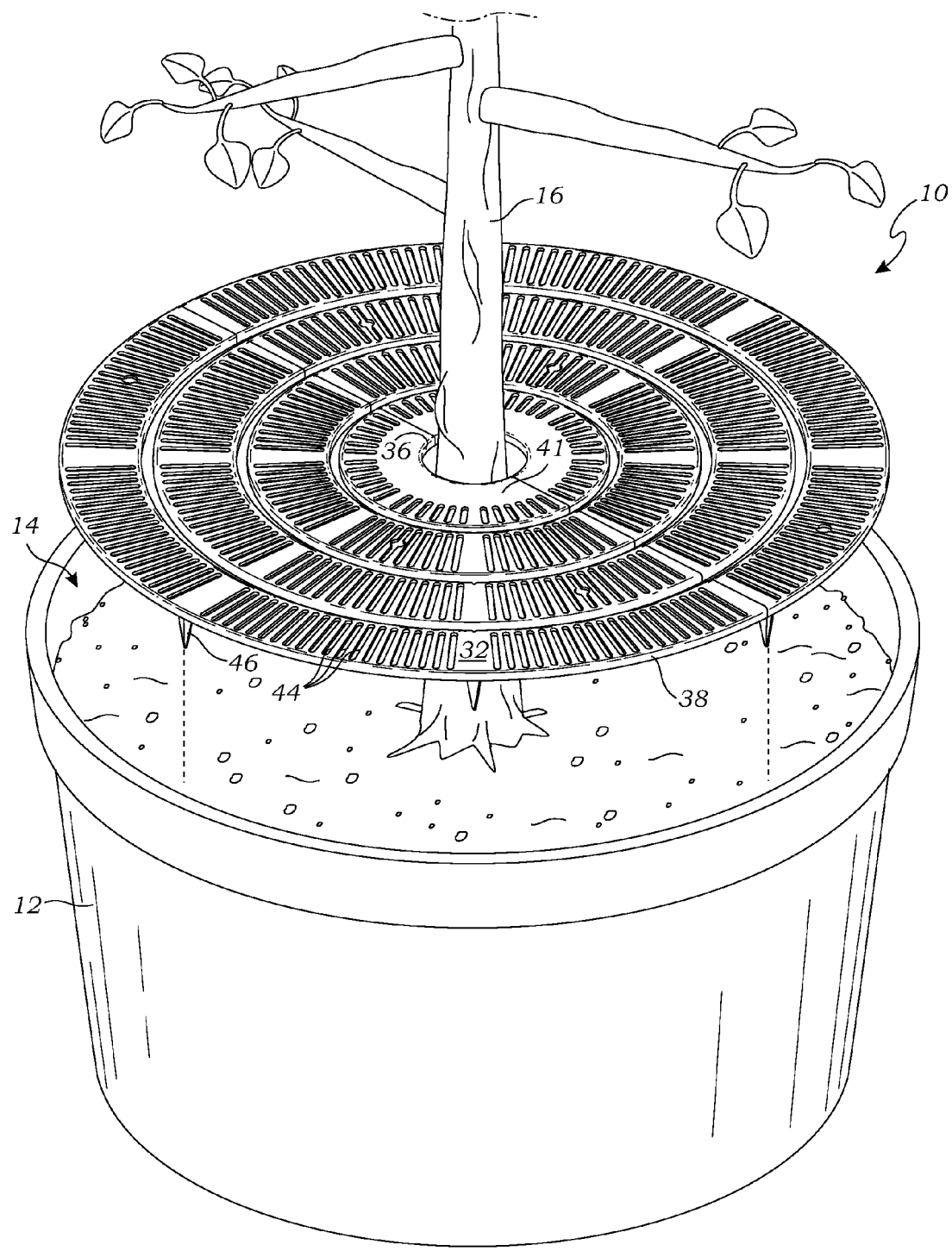
FIG. 3 is an exploded perspective view of the pot cover of FIG. 1, illustrating the pot cover being positioned adjacent one embodiment of a flower pot.

FIG. 1 is a perspective view of one embodiment of the pot cover 10. FIG. 2 is a perspective view of the pot cover 10, illustrating a pair of cover elements 20 being interconnected to form the pot cover 10 of FIG. 1. FIG. 3 is an exploded perspective view thereof, illustrating the pot cover 10 being positioned adjacent one embodiment of a flower pot 12.

As illustrated in FIGS. 1-3, the pot cover 10 is a generally planar construction that is shaped and adapted to fit around the plant 16 and cover the soil 18 in the flower pot 12. As discussed in greater detail above, the pot cover 10 protects the plant 16, it protects the soil 18 from being disturbed (i.e., by digging pets, etc.), it prevents fruit (e.g., strawberries) from sitting in the soil and rotting, and it provides many other benefits, as discussed above.

As illustrated in FIG. 2, the pair of cover elements 20 are removably interlockable to together form a pot cover body 22 of the pot cover 10. While one embodiment of this construction is illustrated (i.e., two equal halves), those skilled in the art may devise many alternative embodiments. For example, one piece could be approximately ⅓ of the diameter, while the second piece is ⅔ of the structure, as long as the pieces can be positioned around the plant 16 and then attached to each other, as discussed below.

As illustrated in FIGS. 1-3, the pot cover body 22 is formed by a plurality of annular cover elements 30 that are concentrically arranged on a horizontal plane HP to together provide a top surface 32, an opposed bottom surface 34, an inner perimeter edge 36, and an outer perimeter edge 38, with the inner perimeter edge 36 having an inner diameter ID and the outer perimeter edge 38 having an outer diameter OD. A plurality of concentric spaces 39 are formed between each of the plurality of annular cover elements 30.

For purposes of this application, the term "horizontal plane" is hereby defined to include any structure that functions to extend horizontally to cover the soil 18 in the flower pot 12. The actual geometry of the pot cover body 22 may be non-planar, including hemispherical, pyramidal, cuboid, and any form of irregular shape or other construction that functions as described. Furthermore, the term "spaces" does not require an actual air gap between the annular cover elements 30, just that the annular cover elements 30 are not connected except as provided below. In the present embodiment, however, there is an air gap, to facilitate removing of some of the annular cover elements 30, as described below.

A plurality of radially extending connector strips 40 interconnect the plurality of annular cover elements 30 to hold the plurality of annular cover elements 30 in the horizontal plane HP (including related constructions described above). For purposes of this application, the term "radially extending" includes any forms of chords or other constructions functional for interconnecting the annular cover elements 30, and does not require a perfect radial geometry or symmetry. Furthermore, the term "strip" includes any construction (e.g., ribbons, rods, frangible connectors, etc.) that may be used to connect the annular cover elements 30 as described, and suitable for easy cutting or breaking, as described below.

The connector strips 40 are adapted to be cut between two of the annular cover elements 30 to remove one or more of the annular cover elements 30 for the purposes of selectively increasing the inner diameter ID and/or reducing the outer diameter OD of the pot cover body 22, to adjust the pot cover 10 to accommodate larger plants 16 and different sizes of flower pots 12. In the embodiment of FIG. 1, the pot cover 10 includes four annular cover elements 30. Obviously, different numbers of annular cover elements 30 may be used. An inner ring 41 (or more than one) may be removed to increase the inner diameter ID to accommodate larger plants 16. Furthermore, one or more of the outer ring(s) 42 may be removed if the pot cover 10 is used in a smaller flower pot 12 (not shown).

In one embodiment, as illustrated in FIG. 1, the pot cover 10 further comprises a plurality of ventilation slots 44 formed through the top and bottom surfaces 32 and 34 of the pot cover body 22. In the embodiment of FIG. 1, the plurality of ventilation slots 44 extend radially across each of the plurality of annular cover elements 30. In alternative embodiments, alternative forms of ventilation slots 44, holes or other elements may be used, or no ventilation slots 44 at all may be used.

In addition to the ventilation slots 44, the pot cover 10 may further include irrigation apertures 54 through the top and bottom surfaces 32 and 34 of the pot cover body 22. As discussed below, the irrigation apertures 54 have a larger diameter than the ventilation slots 44, and are adapted to receive an irrigation container 60 or system to be positioned through the pot cover 10 for irrigating the soil 18, as illustrated in FIG. 5 and discussed below.

In one embodiment, a plurality of legs 46 extend downwardly from each of the connector strips 40 for supporting the pot cover body 22 over the soil 18. In one embodiment, each of the plurality of legs 46 includes a pair of leg elements 48 extending downwardly to form an arch.

In alternative embodiments, the two cover elements 20 may be engaged together to form the pot cover body 22 using any connection mechanisms known in the art. As best illustrated in FIG. 3, in one embodiment the cover elements 20 are interconnected using locking tabs 50 and slots 52. In the embodiment of FIG. 3, the locking tabs 50 extend downwardly from each of the annular cover elements 30 perpendicular to the horizontal plane HP of the annular cover elements 30. The slots 52 may be formed in each of the annular cover elements 30, and are shaped to receive the locking tabs 50 therethrough. The pair of cover elements 20 may therefore be interconnected by interlocking the tabs 50 of one of the pair of cover elements 20 with the slots 52 of the other of the pair of cover elements 20.

In one embodiment, each of the slots 52 is formed though one of the legs of the connector strips 40, above the arch of the pair of leg elements 48. In alternative embodiments, other forms of slots 52 and tabs 50 may be used to form the interconnection required to form the pot cover body 22.

Figure 4:
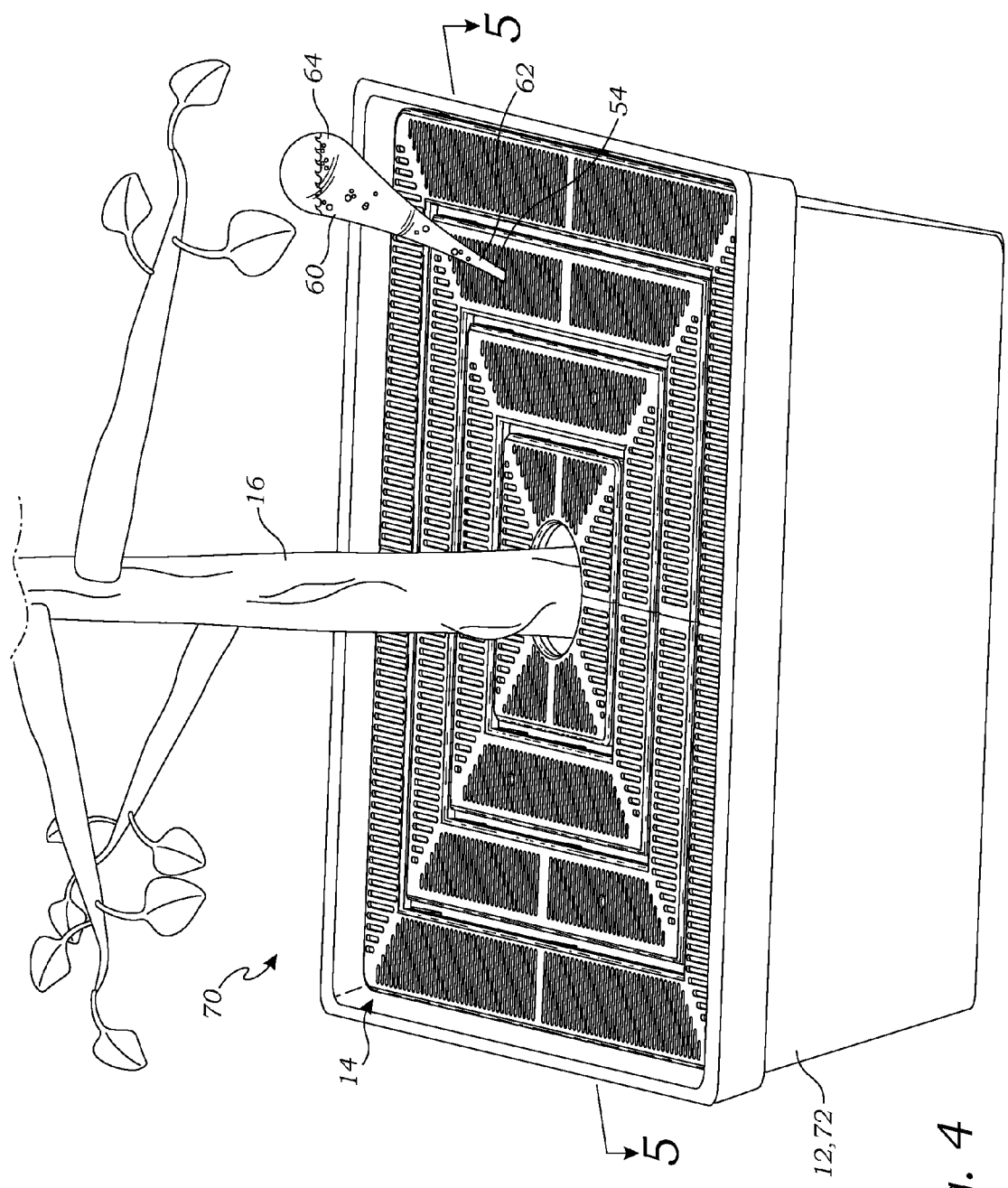
FIG. 4 is a perspective view of a second embodiment of the pot cover operably positioned in a second embodiment of the flower pot.

FIG. 4 is a perspective view of a second embodiment of the pot cover 70 operably positioned in a second embodiment of the flower pot 72. In this embodiment, the flower pot 72 has a square cross-section, and so the pot cover 70 has a corresponding square shape. As illustrated, alternative shapes (e.g., square) may still be matched with an annular construction equivalent to the pot cover 10 of FIG. 1.

FIG. 5 is a sectional view thereof taken along line 5-5 in FIG. 4. As illustrated in FIG. 5, the pot cover 70 rests on the soil 18 supported by the plurality of legs 46. The irrigation apertures 54 through the top and bottom surface 32 and 34 of the pot cover body 22, discussed above, are adapted to receive the irrigation container 60 or system through the pot cover 70 for irrigating the soil 18. In one embodiment, the irrigation container 60 includes an elongate neck 62 that is adapted to be positioned through the irrigation aperture so that the irrigation container 60 may irrigate the soil 18 in the flower pot 72. A reservoir 64 of the irrigation container 60 may be filled with water so that the water will slowly drain into the soil through the elongate neck 62.

FIGS. 1-5 together illustrate a method for covering the flower pot 12 using the above-described pot cover 10. Once the plant 16 has been planted in the soil within the flower pot 12, the flower pot 12 is assembled together around the plant 16. If the pot cover 10 does not fit around the plant 16, the radially extending connector strips 40 are cut between two of the annular cover elements 30 to remove at least one of the annular cover elements 30 for the purposes of selectively increasing the inner diameter ID. If the pot cover 10 does not fit within the flower pot 12, the connector strips 40 are cut between two of the annular cover elements 30 to remove at least one of the annular cover elements 30 for the purposes of selectively reducing the outer diameter OD of the pot cover body 22, to adjust the pot cover 10 to accommodate smaller sizes of flower pots 12. The pair of cover elements 20 may then be interlocked on either side of the plant 16 so that the plant 16 extends through the inner perimeter edge 36 of the pot cover 10, and such that the pot cover 10 fits within the flower pot 12 and covers substantially all of the soil 18.

Once installed, the irrigation container 60 may then be filled with water and positioned through the irrigation aperture 54, so that the water may flow from the reservoir 64 through the elongate neck 62 an into the soil 18, so that the irrigation container 60 may irrigate the soil 18 in the flower pot 12 through the pot cover 10.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A method for covering a flower pot, the method comprising the steps of:

providing a plant and soil;

planting the plant in the soil within the flower pot;

providing a pair of cover elements that are removably interlockable to together form a pot cover body, the pot cover body comprising:

a plurality of annular cover elements that are concentrically arranged on a horizontal plane to together provide a top surface, an opposed bottom surface, an inner perimeter edge, and an outer perimeter edge, with the inner perimeter edge having an inner diameter and the outer perimeter edge having an outer diameter;

a plurality of elongate ventilation slots disposed radially through each of the plurality of annular cover elements;

a plurality of concentric spaces formed between each of the plurality of annular cover elements;

a plurality of radially extending connector strips that interconnect the plurality of annular cover elements to hold the plurality of annular cover elements in the horizontal plane;

a plurality of legs that extend downwardly from each of the connector strips for supporting the pot cover body over the soil; and each of the plurality of annular cover elements having a locking tab extending outwardly and downwardly from one end and a locking slot at the other end, the locking slot being formed between two of the plurality of legs and beneath one of the plurality of annular cover elements;

cutting the radially extending connector strips between two of the annular cover elements to remove at least one of the annular cover elements for the purposes of selectively increasing the inner diameter and/or reducing the outer diameter of the pot cover body, to adjust the pot cover to accommodate different sized plants and different sizes of flower pots;

positioning the pair of cover elements on either side of the plant so that the plant extends through the inner perimeter edge of the pot cover, and such that the pot cover fits within the flower pot and covers substantially all of the soil, and such that the pair of cover elements are not parallel; and inserting each of the locking tabs into one of the locking slots so that the pair of cover elements become engaged with one another; and pivoting the pair of cover elements so that they are in a planar configuration, thereby locking the locking tabs within the locking slots so that the pair of cover elements are locked together.

* * * * *